United States Patent
Aylward et al.

(10) Patent No.: US 8,974,663 B2
(45) Date of Patent: Mar. 10, 2015

(54) SYSTEMS AND METHODS FOR COLLECTING AND DISTRIBUTING GRAY WATER

(71) Applicant: Southwest Water Solutions, LLC, Jamul, CA (US)

(72) Inventors: Peter G. Aylward, Jamul, CA (US); Brian Leto, Newport Beach, CA (US); Darryl Mack, Davis, CA (US); Jon Dannenberg, Dixon, CA (US)

(73) Assignee: Aquaverde, Inc., Jamul, CA (US)

( * ) Notice: Subject to any disclaimer, the term of this patent is extended or adjusted under 35 U.S.C. 154(b) by 0 days.

(21) Appl. No.: 13/872,091

(22) Filed: Apr. 27, 2013

(65) Prior Publication Data
US 2013/0284658 A1    Oct. 31, 2013

Related U.S. Application Data

(60) Provisional application No. 61/639,383, filed on Apr. 27, 2012.

(51) Int. Cl.
| | |
|---|---|
| B01D 21/30 | (2006.01) |
| G05D 11/00 | (2006.01) |
| F16K 5/10 | (2006.01) |
| F16K 5/04 | (2006.01) |
| B01D 29/66 | (2006.01) |
| F16K 37/00 | (2006.01) |
| F16K 31/04 | (2006.01) |
| B01D 21/34 | (2006.01) |

(52) U.S. Cl.
CPC . *F16K 5/04* (2013.01); *B01D 29/66* (2013.01); *B01D 21/34* (2013.01); *F16K 5/10* (2013.01); *B01D 21/30* (2013.01); *F16K 37/0025* (2013.01); *F16K 5/0421* (2013.01); *F16K 31/043* (2013.01)

USPC ............... 210/141; 210/145; 210/85; 210/87; 137/119.01; 251/208; 251/209

(58) Field of Classification Search
None
See application file for complete search history.

(56) References Cited

U.S. PATENT DOCUMENTS

| | | | | |
|---|---|---|---|---|
| 3,208,719 | A | | 9/1965 | Hulsey |
| 3,593,739 | A | * | 7/1971 | Mercier .......................... 137/377 |
| 4,174,925 | A | * | 11/1979 | Pfenning et al. ............... 417/225 |
| 6,217,004 | B1 | | 4/2001 | Tanner |
| 6,904,926 | B2 | | 6/2005 | Aylward et al. |
| 2008/0105842 | A1 | * | 5/2008 | Webster et al. ................ 251/180 |

FOREIGN PATENT DOCUMENTS

| | | |
|---|---|---|
| DE | 1550400 A1 | 9/1969 |
| EP | 1397993 A1 | 3/2004 |

* cited by examiner

*Primary Examiner* — Nam Nguyen
*Assistant Examiner* — Richard Gurtowski
(74) *Attorney, Agent, or Firm* — Heidi L. Eisenhut; Loza & Loza LLP

(57) ABSTRACT

A collection valve for use in a water reclamation system is provided. The collection valve comprises (i) a drain pipe connectable to a drain line in which gray water flows, the drain pipe comprising an inlet pipe, a medial pipe, and an outlet pipe; the medial pipe having a first opening rotatable from a first position to a second position; (ii) a valve plug pipe, surrounding the medial pipe, having an second opening; and (iii) an actuator assembly for rotating the medial pipe between the first and second positions. Rotating the medial pipe to the first position causes the first opening to be in alignment with the second opening causing gray water to drain into a tank. Rotating the medial pipe to the second position misaligns the first and second opening causing fluid passing through the medial pipe or drain to a sewer or septic tank.

20 Claims, 14 Drawing Sheets

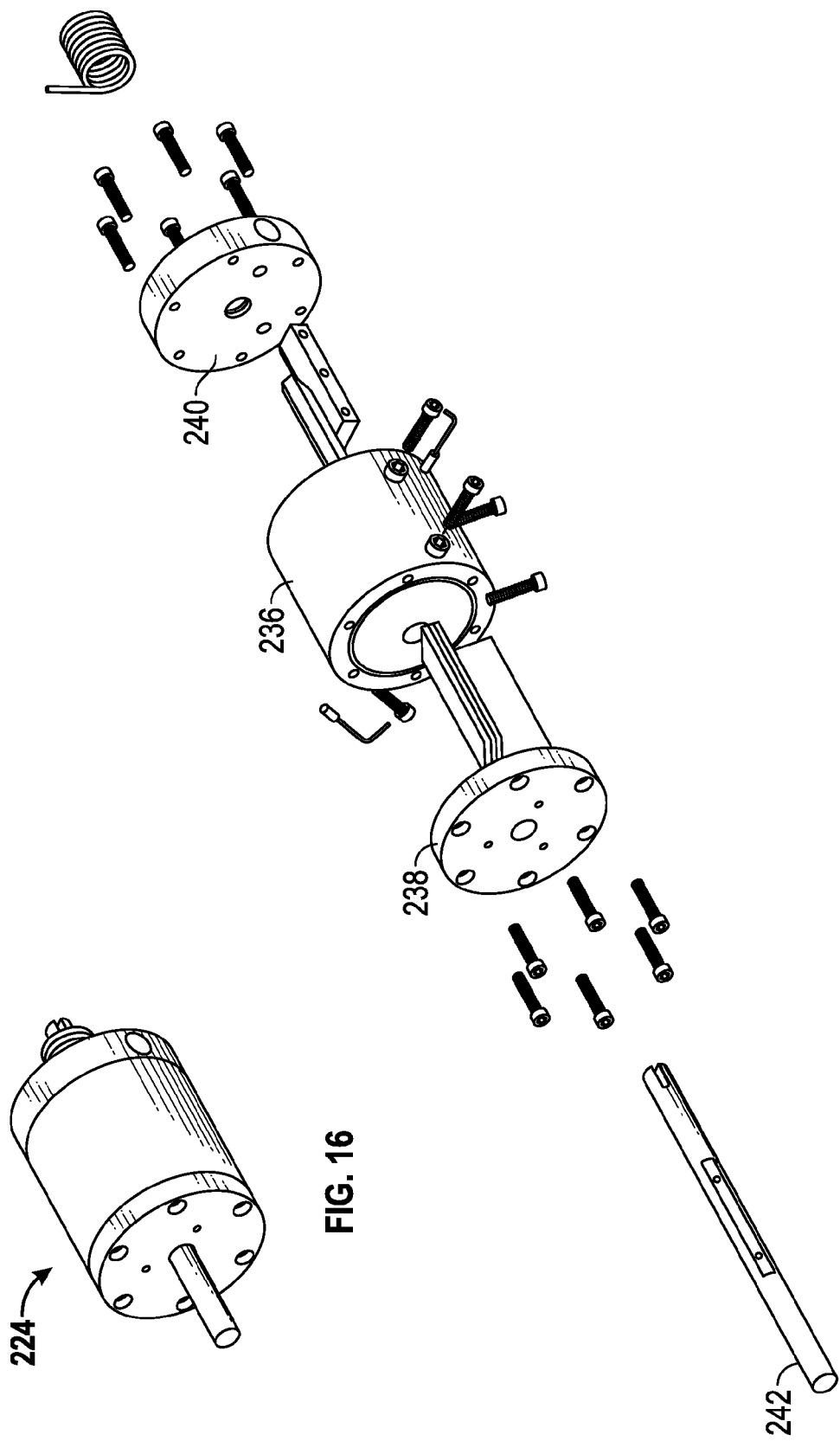

SYSTEMS AND METHODS FOR COLLECTING AND DISTRIBUTING GRAY WATER

CLAIM OF PRIORITY UNDER 35 U.S.C. §119

The present Utility Application for Patent claims priority to U.S. Provisional Application No. 61/639,383 entitled "SYSTEMS AND METHODS FOR COLLECTION AND DISTRIBUTING GRAY WATER" filed Apr. 27, 2012, and hereby expressly incorporated by reference herein.

FIELD OF INVENTION

The present invention relates to water reclamation systems, and in particular, to gray water reclamation systems.

BACKGROUND OF INVENTION

As known in the art, "gray" water refers to water containing low levels of contaminants and which is typically not potable, but can be recycled and used in particular applications, such as irrigation water, toilet water, as well as some industrial applications. Gray water typically originates from non-toxic household uses, such as from showers, bathtubs, and from non-chemical/toxic sink drainage. Gray water can also originate from the environment itself, for example, rain run-off from a gutter assembly of a home. "Black" water is distinguished from gray water in that black water contains a high amount of particulates and/or contaminants which requires heavy water treatment. Black water is also defined by its source, such as water originating from a toilet is defined as black water even if it is perfectly clean. Fresh, "white" or "potable" water is water which is most commonly used for drinking and cooking.

While fresh water is absolutely essential for life, it has become a diminishing resource around the world. As populations in arid areas continue to expand, drought conditions affect wide spread areas. Additionally, pollution from factories and plants may contaminate water reserves making fresh water more difficult to obtain. Access to fresh water is becoming increasingly expensive in view of at least these factors. In certain areas around the globe, fresh water has been completely exhausted or contaminated, and this trend is expected to become more pervasive in larger, industrial areas as well as areas with sub-standard plumbing systems.

Water reclamation has been a central point in proposed approaches to conserve fresh water resources. However, water collection valves that are used in these approaches are overly complex and expensive as excessive quantities of components are used which reduces reliability and makes the collection valves cost prohibitive. Furthermore, existing water collection valves use non-approved components which then require that the valves undergo an extensive qualification process by industrial governing bodies.

Accordingly, a new gray water collection valve is needed to address the foregoing difficulties. Particularly, a new gray water collection valve that uses pre-approved, off-the-shelf parts to reduce costs and eliminate the need for approval by industrial governing bodies is needed.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspect of the disclosure. Its sole purpose is to present some concepts of one or more aspects of the disclosure in a simplified form as a prelude to the more detailed description that is presented later.

In one aspect, the disclosure provides a collection valve for use in a water reclamation system. The collection valve includes a drain pipe connectable to a drain line in which gray water flows, the drain pipe comprising an inlet pipe, a medial pipe, and an outlet pipe wherein the medial pipe has a first opening is rotatable from a first position to a second position; a valve plug pipe, surrounding the medial pipe, having an second opening; and an actuator assembly, coupled to the valve plug pipe by an actuator bracket, for rotating the medial pipe between the first and second positions; wherein when the medial pipe is rotated to the first position, the first opening of the medial pipe is in alignment with the second opening of the valve plug pipe allowing fluid passing through the medial pipe to drain into a collection tank; and wherein when the medial pipe is rotated to the second position, the first opening of the medial pipe is not in alignment with the second opening of the valve plug pipe causing fluid passing through the medial pipe or drain to a sewer or septic tank.

The collection valve also includes a first valve body pipe stub coupling the medial pipe to the outlet pipe; and a second valve body pipe stub coupling the medial pipe to the inlet pipe. The first valve body pipe stub and the second valve body pipe stub are non-rotatable. A first collar is placed around the coupling of the inlet pipe and the medial pipe; and a second collar is placed around the coupling of the outlet pipe and the medial pipe.

To prevent leakage of fluid flowing through the valve, a first seal joins the medial pipe to the first valve body pipe stub; and a second seal joins the medial pipe to the second valve body pipe stub. To prevent debris from getting lodged in the seals, shields may be placed over the seals. For example, a first shield having a first portion is fixedly attached to the first valve body pipe stub and a second portion extends over, and is unattached to, the first seal and the medial pipe; and while a second shield having a first portion is fixedly attached to the first valve body pipe stub and a second portion extends over, and is unattached to, the second seal and the medial pipe. The first seal and the second seal may be circular in shape and have a diameter slightly less than the diameters of the medial pipe, the first valve body pipe stub and the second valve body pipe stub.

The collection valve also includes a drive pulley secured to the actuator assembly; and a drive belt wrapped around the drive pulley and the valve plug pipe for rotating the medial pipe.

In yet another aspect, a gray water collection system is provided. The system includes a main drain line; at least one black water source connected to the main drain line; at least one gray water source connected to the main drain line; and a collection valve located downstream from at least one of the one or more black water sources. The collection valve includes a drain pipe connectable to the drain line in which gray water flows, the drain pipe comprising an inlet pipe, a medial pipe, and an outlet pipe wherein the medial pipe has a first opening rotatable from a first position to a second position; a valve plug pipe, surrounding the medial pipe, having an second opening; and an actuator assembly, coupled to the valve plug pipe, for rotating the medial pipe between the first and second positions; wherein when the medial pipe is rotated to the first position, the first opening of the medial pipe is in alignment with the second opening of the valve plug pipe allowing fluid to pass passing through the medial pipe to drain into a collection tank; and wherein when the medial pipe is rotated to the second position, the first opening of the medial pipe is not in alignment with the second opening of the valve plug pipe causing fluid passing through the medial pipe or drain to a sewer or septic tank.

The system further includes a base control unit in communication with the at least one black water source, the at least one gray water source and the collection valve for monitoring the system. Furthermore, a pump may be located within the collection tank for supplying the gray water collected within the collection tank to a filter for removing and/or reducing particulates and contaminants in the collected gray water; and an automatic back flush line is connected to the filter for allowing temporary reversal of fluid flow to the filter. An ultraviolet (UV) light may be connected to the base control unit and used to destroy organisms and/or pathogens in the collected gray water.

A described above, to prevent leakage of fluid flowing through the valve, the collection valve may include a first seal for joining the medial pipe to the first valve body pipe stub; and a second seal for joining the medial pipe to the second valve body pipe stub. To prevent debris from getting lodged in the seals, shields may be placed over the seals.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

FIG. 16 illustrates a perspective view of an actuator assembly.

FIG. 17 illustrates an exploded view of the actuator assembly of FIG. 16.

DETAILED DESCRIPTION

In the following detailed description, numerous specific details are set forth in order to provide a thorough understanding of the embodiments. However, it will be understood by one of ordinary skill in the art that the embodiments may be practiced without these specific details. For example, operations may be shown in block diagrams, or not be shown at all, in order not to obscure the embodiments in unnecessary detail. In other instances, well-known operations, structures and techniques may not be shown in detail in order not to obscure the embodiments.

Overview

The system of the present disclosure may be attached to an exterior ABS main drain line of a home by inserting a valve and collection tank in the drain line before it reaches the sewer line or septic tank. This valve has a non-invasive sensor that detects the flow of gray water and allows the drain line to clean out or be flushed with gray water for two minutes, for example, prior to collection from the drain line ensuring that the collected gray water does not come in contact with toilet effluent or other black water in the main drain line. This ability to clean out the drain line permits the system to meet the definition of gray water, which means untreated household gray water has not come in contact with toilet effluent or other black water.

In concert with the sensor on the collection valve are additional sensors on all black water sources inside the home. The kitchen sink, dishwasher, water softener and each toilet have a black water sensor. The system may include a manual activation timer in the utility room so that the home owner can consciously enable the system to collect gray water or leave it disabled when they are rinsing diapers in a tub or doing laundry that has been soiled with human waste (this is a safer solution than dual plumbed homes which collect all bath or shower water and all washing machine water). When the timer is on, the collection valve will open for gray water flow unless the black water sensors inside the home send a radio signal to the valve which if collecting, automatically shuts. In this case the valve will not open again until the black water event has ended and the cleanout period has been repeated. The sensors, radios, timer and collection valve are all managed by a master controller or base station unit that constantly monitors the entire system to ensure that all components are functioning correctly. If any component fails to properly respond to the controller's polling, the system will annunciate the problem and will remain in a safe default state with the valve closed. That state is equivalent to the original plumbing design and no gray water will be collected.

Gray Water Reclamation System

Figure 1:
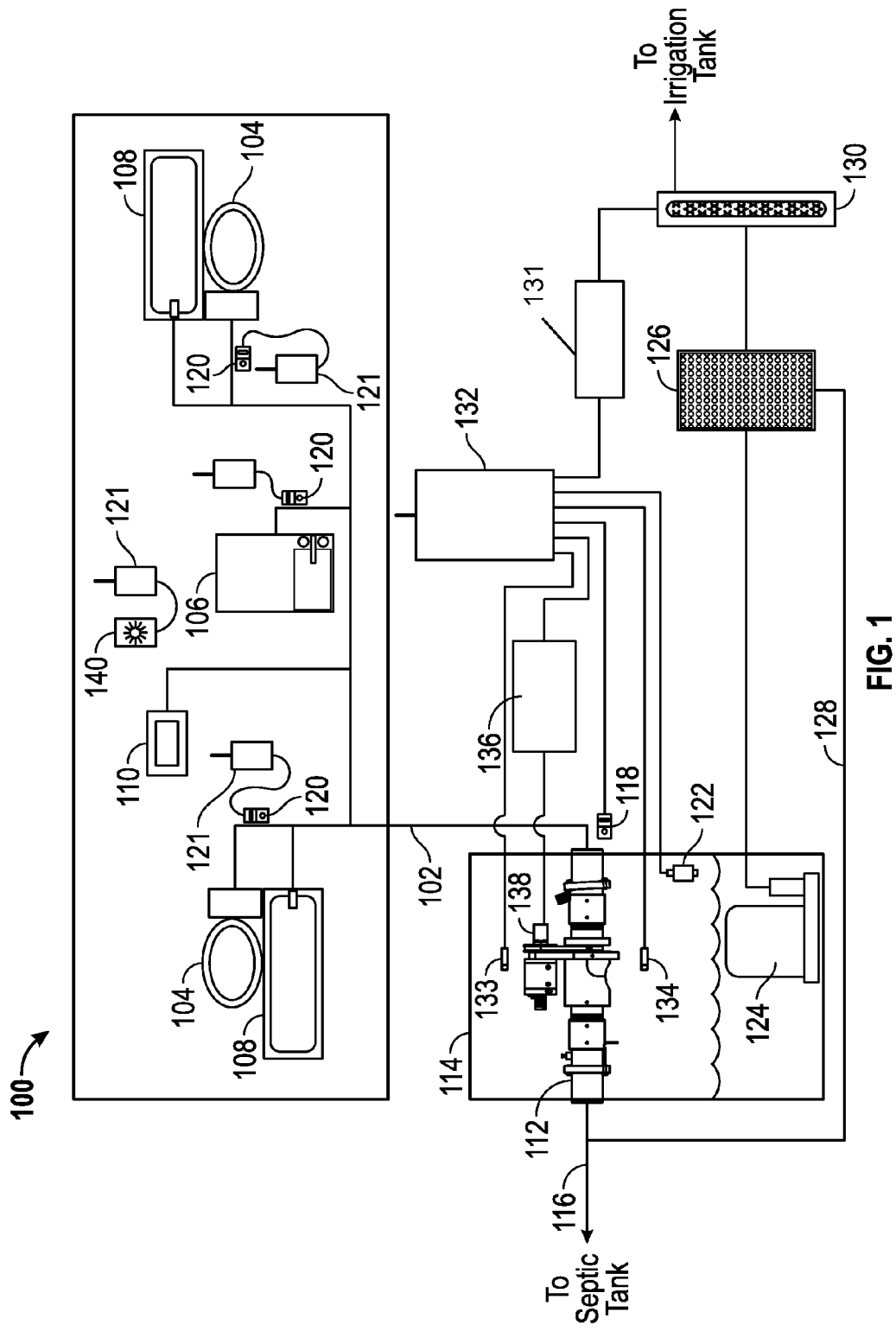
FIG. 1 illustrates a gray water reclamation system in accordance with one aspect.

FIG. 1 illustrates a gray water reclamation system 100 in accordance with one embodiment of the present disclosure. The system 100 may include "black" water sources and "gray" water sources that drain to an exterior ABS main drain line 102 of a home. Black water sources may include, but are not limited to, toilets 104, a kitchen sink in line with a garbage disposal 106, a dishwasher (not shown) and a water softening unit (not shown) which produces brine. Gray water sources may include, but are not limited to, bathroom sinks (not shown), bathtubs/showers 108 and clothes washing machines 110.

The system 100 may be attached to the drain line 102 by inserting a collection valve 112 and a collection tank 114 in the drain line 104 before it reaches the sewer line or septic tank 116. As described in further detail below, the collection valve 112 may include a non-invasive flow sensor 118 that detects the flow of gray water in the drain line 104 and allows the drain line 104 to clean out or be flushed with gray water for a specific time period, for example approximately two minutes, prior to collection from the drain line 104 ensuring that the collected gray water does not come in contact with toilet effluent or other black water in the main drain line.

In addition to the flow sensor 118 on the collection valve 112, black water sensors 120 may be located on all black water sources inside the home and detect the flow of black water. As used herein the term "black water event" refers to the discharge of water from a black water source. In an alternative embodiment, gray water sensors may be located on the gray water sources to detect a "gray water event" (i.e., the discharge of water from a gray water source), and as such will be referred to as "gray water sensors." Alternatively, the system 100 may include both black and gray water sensors, i.e., at least one sensor on a black water line and one sensor on a gray water line. As used herein, the term "flow event" refers to the detection of water flow from either a black or gray water source.

The collection valve 112 may direct the drain flow to the sewer line/septic tank 116 or the collection tank 114. According to one embodiment, the collection tank 114 may include an overflow sensor 122 that detects when the collection tank 114 is full to prevent the collection valve 122 from allowing additional gray water to enter the collection tank 114.

The system 100 may further include a pump 124, located within the collection tank 114, configured to supply the collected gray water to a filter 126. The filter may be used to remove and/or reduce the particulates and contaminants in the gray water to an acceptable level and remove particles which could potentially clog the gray water appliance. An automatic back flush line 128 may be connected to the filter 126 to allow the temporary reversal of the flow of fluid to flush out the filter and carry the debris, such as the large particles and fibers, to the sewer/septic tank. The filtered gray water may then be exposed to ultraviolet (UV) light 130, controlled by a UV controller 131, to destroy organisms and/or pathogens in the water and sterilize the gray water. Some advantages of UV sterilization are that it uses no chemicals to sterilize the water, requires minimal maintenance and is significantly less expensive than chlorination systems. Once exposed to UV light 130, the treated gray water may be sent to and stored in an irrigation tank. The treated gray water can then be distributed to gray water appliance(s). In a particular embodiment of the disclosure, the gray water appliance may be an irrigating system, such as a sub-surface irrigation system. In another embodiment, the gray water appliance may be a toilet which reuses the gray water. In still another embodiment, the gray water appliance may be a carwash system, or some such other industrial application which can operate with gray water. Those skilled in the art will appreciate that the system may be used with any appliance which can operate using gray water.

According to one embodiment, a base station control unit 132 may be used to control the central functions of the system 100. That is, the base station control unit 132 may control the operation and/or gather status from the gray water sensors, black water sensors, black water appliances and the gray water appliances, such as an irrigation system.

Specifically, the base station control unit 132 may be operable to communicate with the various sensors in the system and provide instructions. The sensors may include the flow sensor 118, the overflow sensor 122, the black water sensors 120 and any gray water sensors. Additionally, the base station control unit 132 may also be operable to communicate with a closed limit switch 133, an open limit switch 134 and a hydraulic solenoid 136, in communication with a hydraulic actuator 138 on the collection valve 112, for controlling the movement of the collection valve 112.

Responsive to the instructions, the collection valve 112 and filtration system (i.e. pump 124, filter 126 and UV controller 131) may operate in the desired state. In a particular embodiment, the base station control unit 132 may be configured to communicate wirelessly to sensors, although one or more of the sensors may be hardwired connected to the base station control unit 132 in alternative embodiments. The base station control unit 132 may also include a port for receiving external commands such as a shutdown command from the user/operator. A description of the base station control unit 132 is provided with respect to FIGS. 18-20, below.

In a particular embodiment, each of the sensors may operate wirelessly to communicate with the base station control unit 132. In one embodiment, the transmitted signals may be comprised of wireless signals such as those operating within the unlicensed ISM (industrial, scientific and medical) frequency band, and/or signals defined by conventionally-known standards such as "Bluetooth" or IEEE 802.11. Further preferably, each transmitted signal is unique in order to determine the corresponding transmitter's identity. Some or all of aforementioned features may also be implemented in a hardwired system in which each sensor is hardwired to the base station control unit 132. Other communication means, such as optical or mechanical, may be used to transmit the sensor signals to the collection valve 112.

According to one embodiment, the system may include a manual activation timer 140 so that the home owner can consciously enable the system to collect gray water or leave it disabled when they are rinsing diapers in a tub or doing laundry that has been soiled with human waste (this is a safer solution than dual plumbed homes which collect all bath or shower water and all washing machine water). When the timer 140 is on, the collection valve 112 will open for gray water flow unless the black water sensors 120 inside the home send a radio signal, using a transceiver radio 121, to the collection valve 112 which if collecting, automatically shuts. In this case, the valve collection valve 112 will not open again until the black water event has ended and the cleanout period has been repeated. The radio transceiver 121 is operable to transmit signals to, and receive signals from, the base station controller unit 132. The sensors, radios, timer and collection valve are all managed by the base control unit 132 that constantly monitors the entire system to ensure that all components are functioning correctly. If any component fails to properly respond to the base control unit's 132 polling, the system will annunciate the problem and will remain in a safe default state with the valve closed and no gray water will be collected.

In one system embodiment, one or more components of the gray water collection and distribution system are located above the main drain line (e.g., when the main drain line is underground and the filtration system and irrigation tank are located above ground for ease of servicing). In such an embodiment, the pump 124 operates to supply the collected gray water to the filtration system and irrigation tank and/or other above ground system components. In other embodiments in which the gray water components are located below the main drain line (e.g., where the main drain line is a drain pipe in the ceiling of a multi-story residence), the collected gray water may be gravity fed to the gray water components and the pump 124 may be omitted.

Collection Valve

Figure 2:
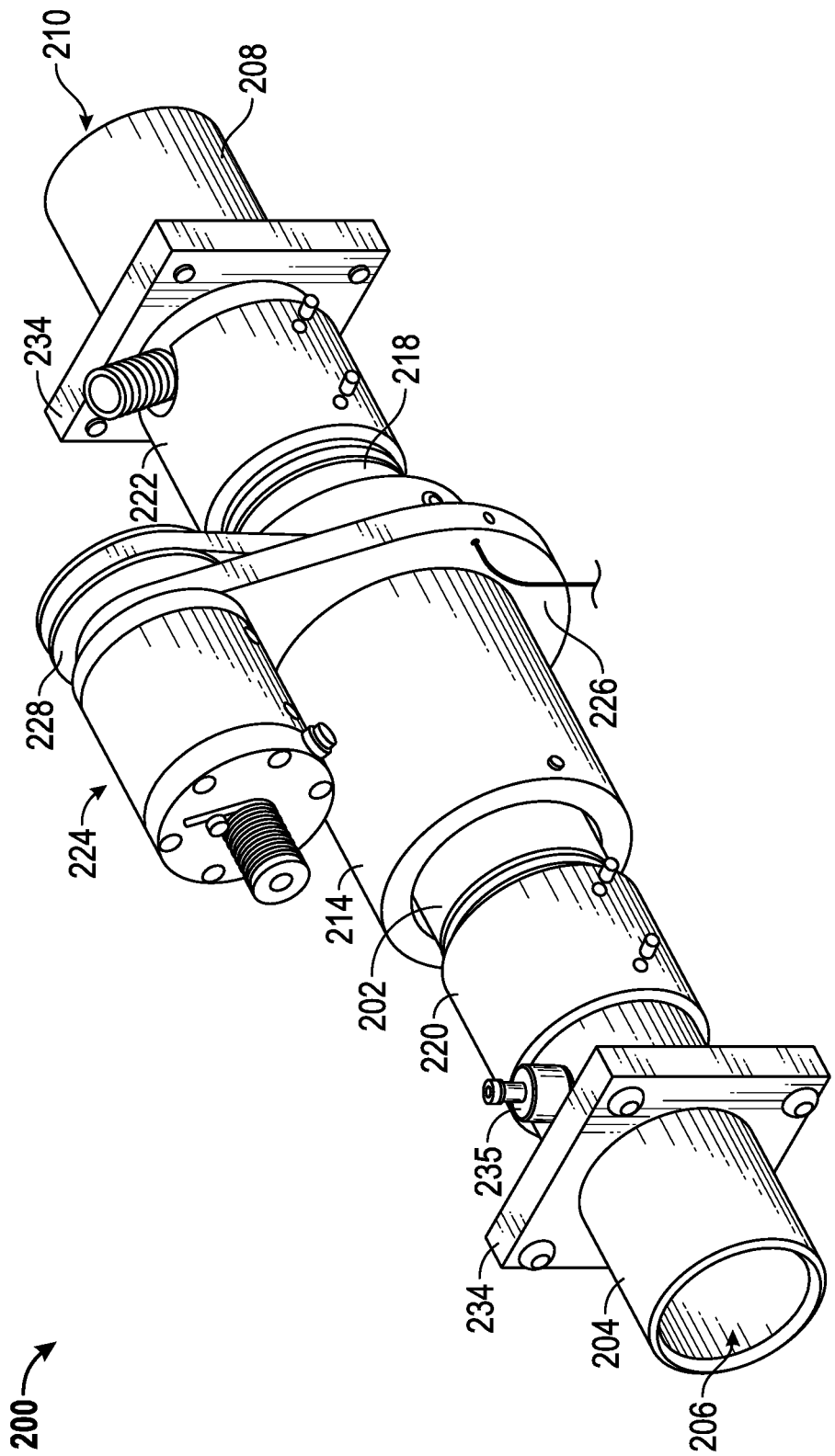
FIG. 2 illustrates a perspective view of a collection valve for use in a water reclamation system in accordance with one aspect.
Figure 3:
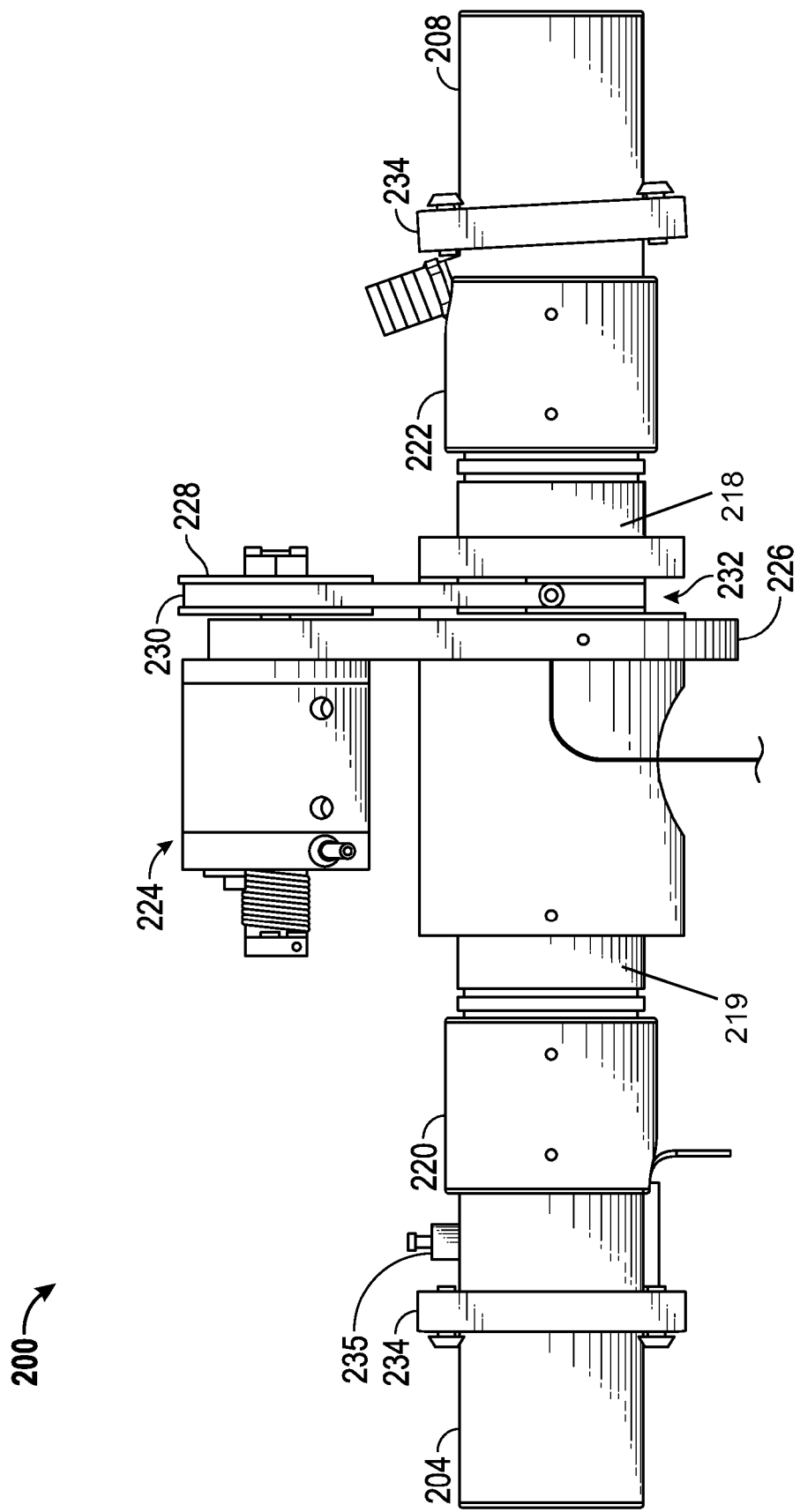
FIG. 3 illustrates a plan view of a collection valve for use in a water reclamation system in accordance with one aspect.

FIGS. 2-3 illustrate a collection valve 200 for use in a water reclamation system in a perspective view and plan view respectively. The collection valve 200 may include a medial pipe 202 coupled between an inlet pipe 204, having an inlet port 206, and an outlet pipe 208, having an outlet port 210. The pipes 202, 204, 208 may be in fluid communication therein and may be comprised of acrylonitrile butadiene styrene (ABS) or polyvinyl chloride (PVC) pipe. In a particular embodiment, the inlet pipe 204 may be connectable to a drain line which supplies gray water and/or white water. For example, the inlet pipe 204 may be adapted to collect run-off rain water from a gutter system. Water which has not previously undergone water treatment is referred to herein as "gray" water. In another embodiment, the inlet pipe 204 may be connectable to a line which supplies either gray or black water. Such a system, for example, the main drain line in a household, is further described in U.S. Pat. No. 6,904,926 commonly owed by the assignee of the present invention and herein incorporated by reference. The outlet pipe 208 may be connectable, in one embodiment, to a black water drain line, such as a sewer main.

Figure 8:
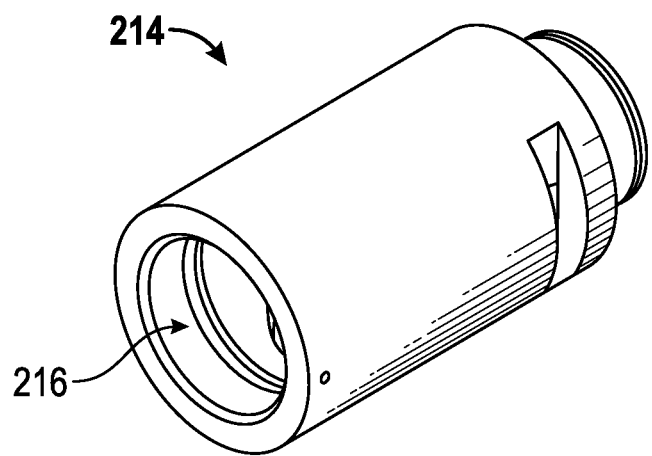
FIG. 8 illustrates a valve plug pipe used in the collection valve of FIG. 3.
Figure 9:
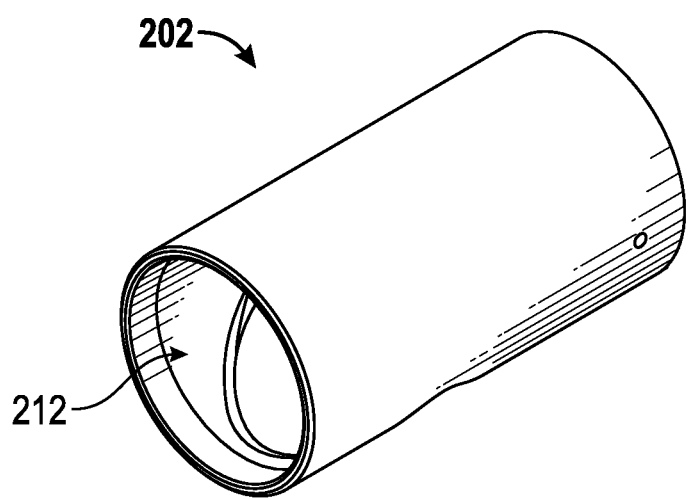
FIG. 9 illustrates a medial pipe used in the collection valve of FIG. 3.

In one embodiment, the medial pipe 202 may include an opening 212 (See FIG. 9) connectable to a gray water collection tank and distribution system, as described above with reference to FIG. 1, and rotatable between a first position and a second position. A valve plug pipe 214 may surround the medial pipe 202 and include an opening 216 (See FIG. 8). When the medial pipe 202 is rotated to the first position, the opening 212 of the medial pipe 202 may be in alignment with the opening 216 of the valve plug pipe 214 allowing fluid passing through the medial pipe 202 to drain into the collection tank. Alternatively, when the medial pipe 202 is rotated to the second position, the opening 212 of the medial pipe 202 is not in alignment with the opening 216 of the valve plug pipe 214 causing fluid passing through the medial pipe 202 to exit or drain to a sewer or septic tank. According to one aspect, the inlet pipe and the outlet pipe are non-rotatable.

Figure 10:
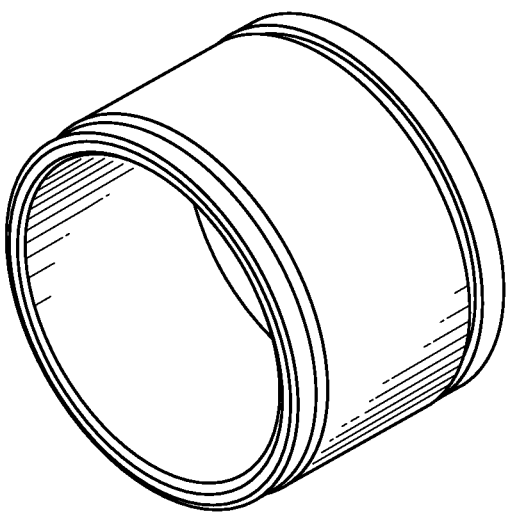
FIG. 10 illustrates a valve body pipe stub used in the collection valve of FIG. 3.
Figure 11:
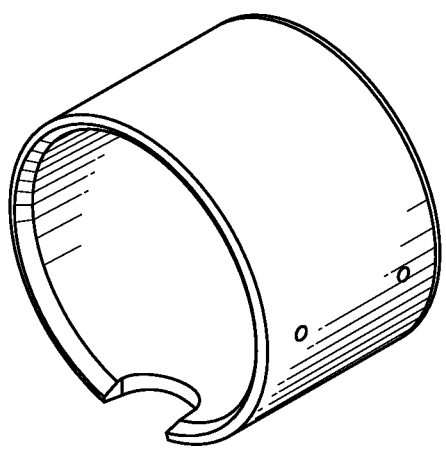
FIG. 11 illustrates a collar used in the collection valve of FIG. 3.
Figure 12:
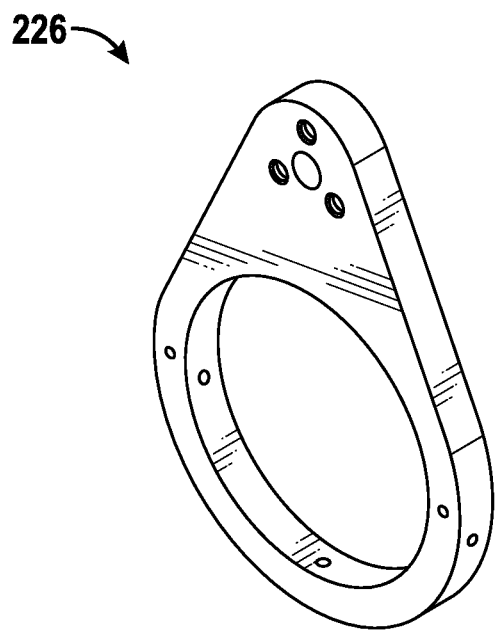
FIG. 12 illustrates an actuator bracket used in the collection valve of FIG. 3.
Figure 13:
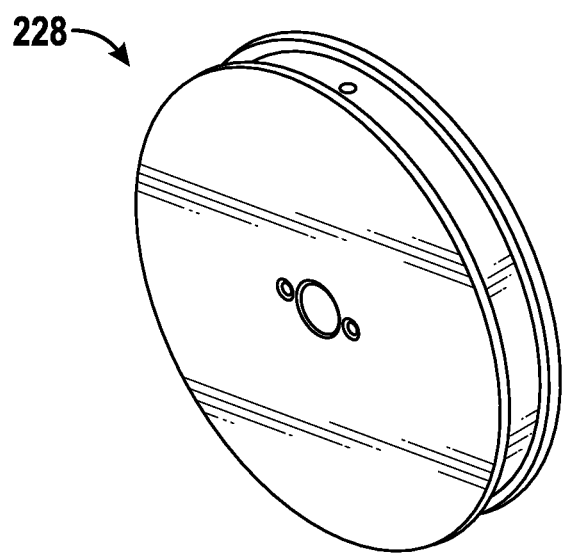
FIG. 13 illustrates a drive pulley used in the collection valve of FIG. 3.
Figure 14:
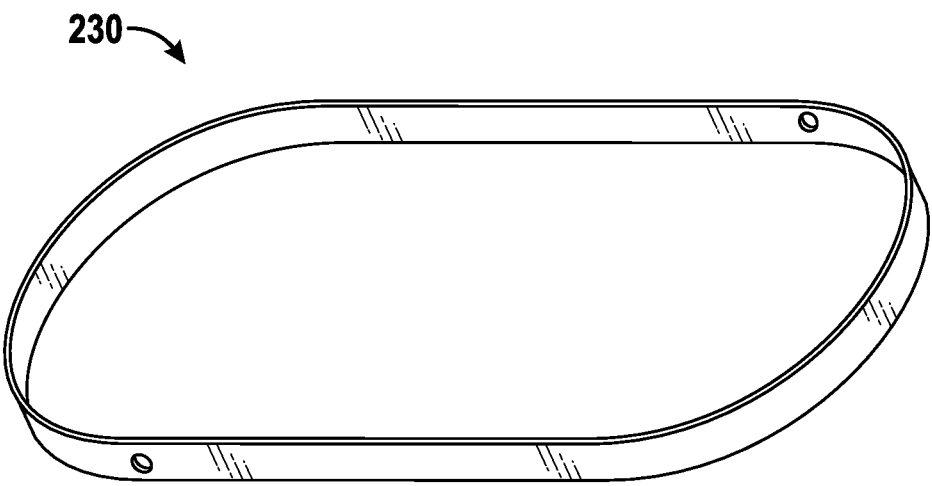
FIG. 14 illustrates a drive belt used in the collection valve of FIG. 3.

A first valve body pipe stub 218 (See FIG. 10) may couple the medial pipe 202 to the outlet pipe 208 and a second valve body pipe stub 219 (See FIG. 10) may couple the medial pipe to the inlet pipe. A first collar 220 (See FIG. 11) may be placed around the coupling (i.e. where the pipes are joined) of the inlet pipe 204 and the medial pipe 202 and a second collar 222 (See FIG. 11) may be placed around the coupling of the outlet pipe 208 and the medial pipe 202. To rotate the medical pipe 202 between the first and second positions, an actuator assembly 224 (discussed in detail below) may be secured to the valve plug pipe 214 using an actuator bracket 226 (See FIG. 12). A drive pulley 228 (See FIG. 13) may be secured to the actuator assembly 224, the actuator bracket located between the drive pulley 228 and the actuator assembly 224. A drive belt 230 (See FIG. 14) may be wrapped around the drive pulley 228 and the valve plug pipe 214. The drive belt 230 may be received within a belt opening 232 located on the valve plug pipe 214 allowing the belt to come in contact with the medial pipe 202 and rotate the medial pipe 202 between the first and second positions.

Figure 15:
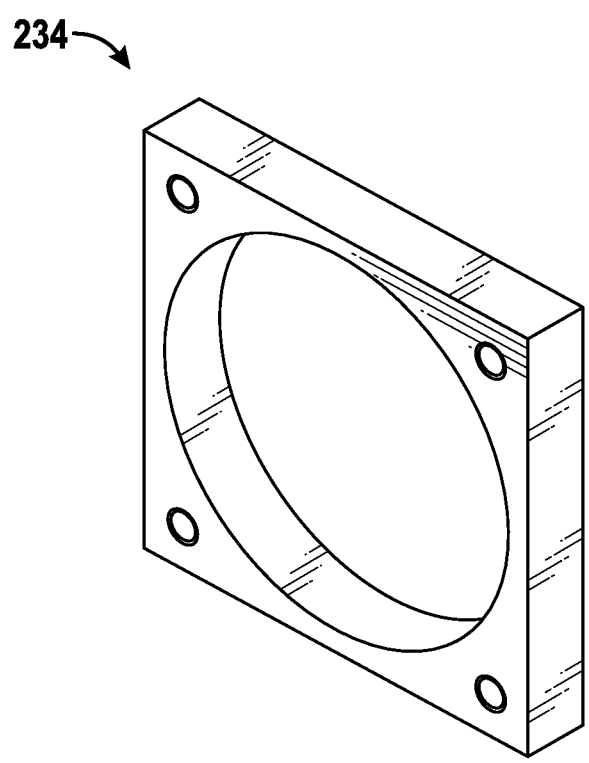
FIG. 15 illustrates a flange used in the collection valve of FIG. 3.

A pair of flanges 234 (See FIG. 15) may be affixed to the inlet pipe 204 and the outlet pipe 208 and function as mounting brackets. The actuator assembly 224 may be used to move the collection valve 200, according to various embodiments, from a closed position to an open position (or first and second positions).

Figure 6:
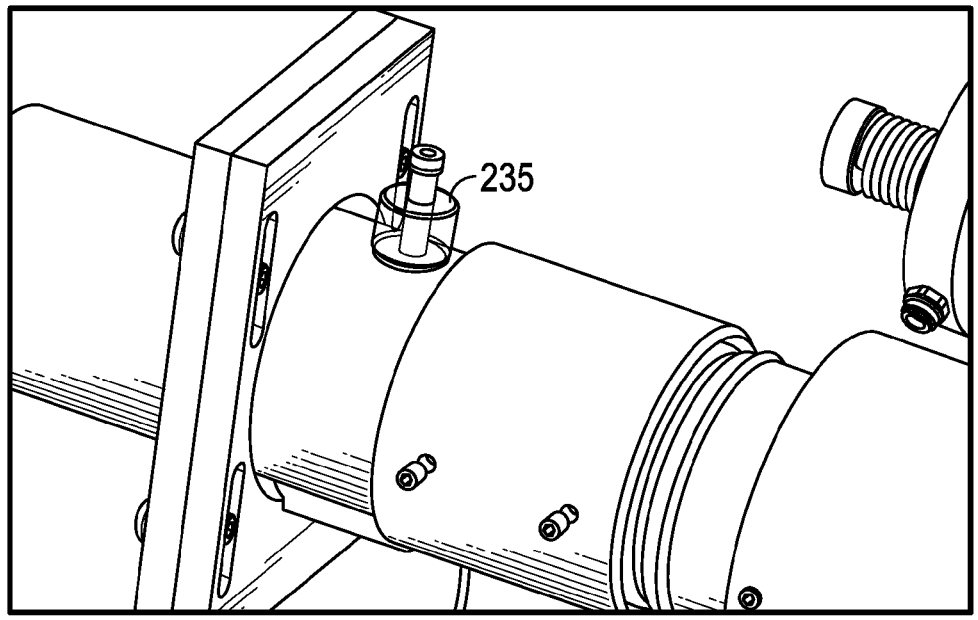
FIG. 6 illustrates a close up view of an overflow valve of the collection valve of FIG. 3 in a closed position.
Figure 7:
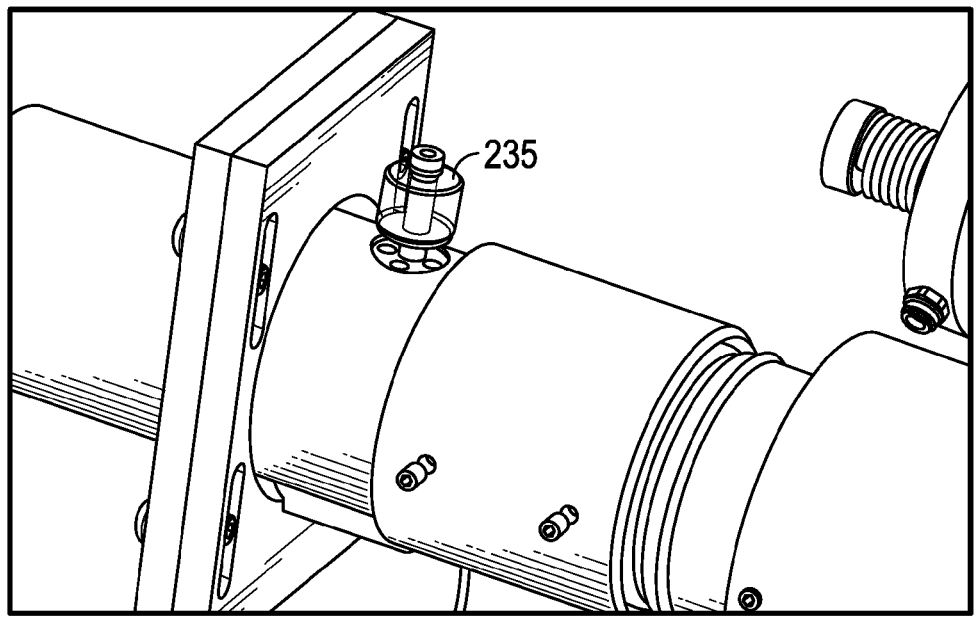
FIG. 7 illustrates a close up view of an overflow valve of the collection valve of FIG. 3 in an open position.

An overflow valve 235 may be mounted on the inlet pipe 204 before the medial pipe 202. When the inlet pipe 204 is completely filled with water, the overflow valve 235 will move from a closed position (See FIG. 6) to an open position (See FIG. 7). When in the open position, the overflow valve 235 is lifted upwards by the water such that the overflow valve is floating on top of the water. When the overflow valve 235 is lifted upwards (i.e. in the open position), one or more holes are exposed allowing excess water flowing through the inlet pipe 204 to flow into the sewer.

Figure 4:
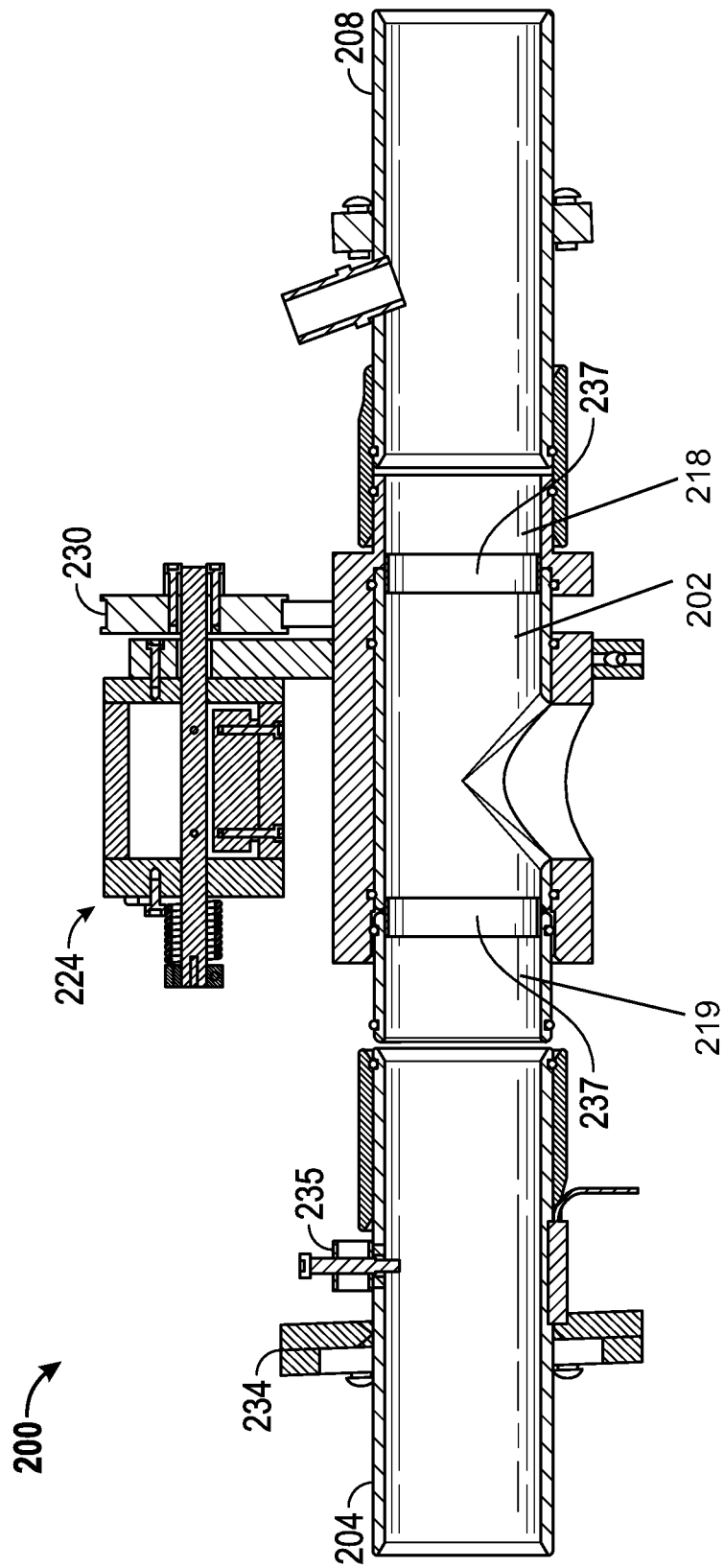
FIG. 4 illustrates a cross-sectional view of the collection valve of FIG. 3 having shields covering over the seals between pipes.
Figure 5:
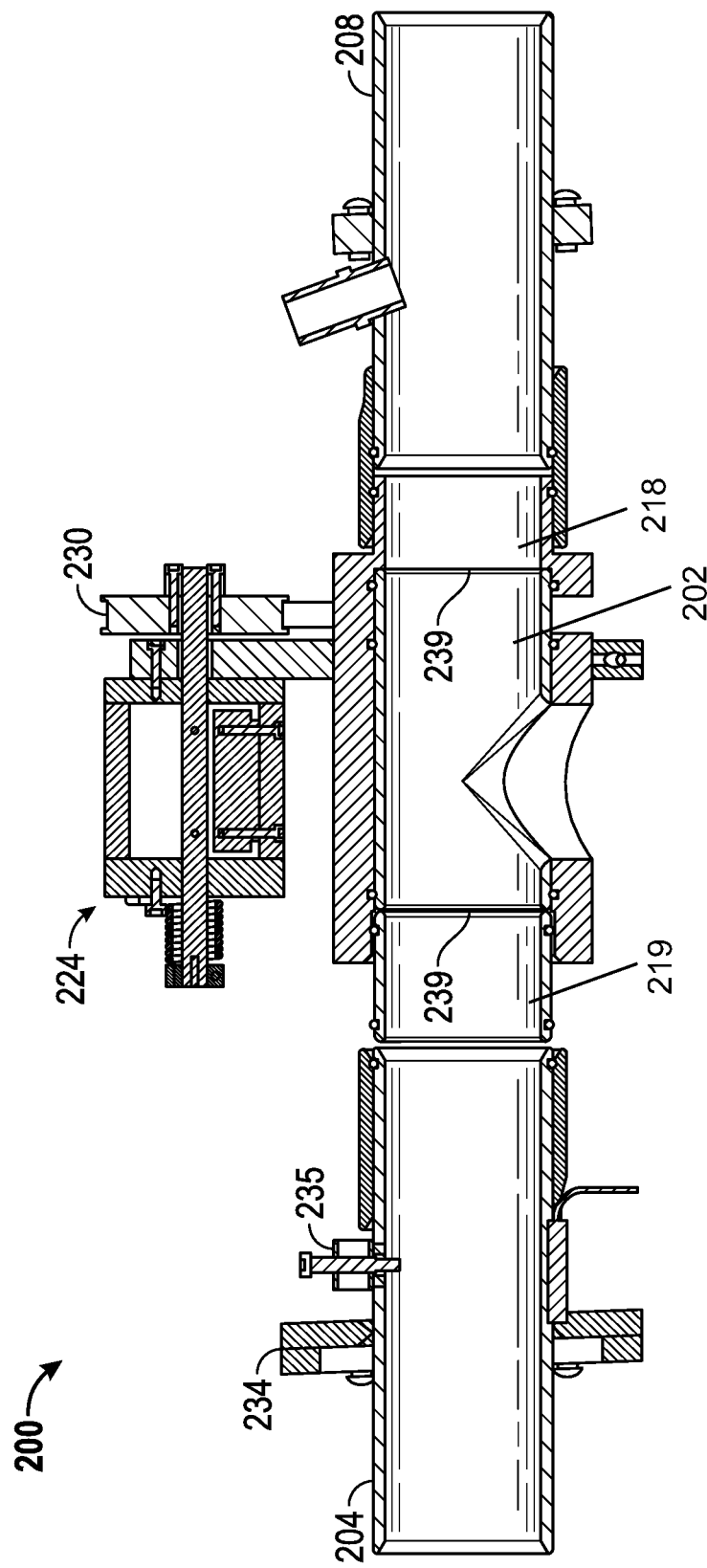
FIG. 5 illustrates a cross-sectional view of the collection valve of FIG. 3 showing the seals between pipes.

FIGS. 4 and 5 illustrate cross-sectional views of the collection valve of FIG. 3. As shown and discussed above, the medial pipe 202 is coupled between the first valve body pipe stub 218 and the second valve body pipe stub 219. Seals 239 (See FIG. 5) may be used to couple (or join) the medial pipe 202 to the first valve body pipe stub 218 as well as joining the medial pipe 202 to the second valve body pipe stub 219 to prevent leakage. The fluids flowing through the collection valve 200 may include debris, such as large particles, sand and fibers and although a majority of the debris will pass through to either the sewer or the collection tank, some debris may become lodged in the seals 239 which can hinder the rotation of the medial pipe 202 between the first position and the second position. To prevent the debris from getting into the seals, shields 237 (See FIG. 4) may be placed over the seals 239 within the interior of the collection valve 200. The shields 237 may be generally circular in shape and have a diameter slightly less than the diameters of the medial pipe 202, the first valve body pipe stub 218 and the second valve body pipe stub 219. According to one embodiment, the width of each shield 237 may be greater than the width of each seal 239 such that the seals 239 are completed covered. Each shield 237 may have a portion fixedly attached to a valve body pipe stub and extend over the seal and the coupling of the seals 239 to the medial pipe 202. As each shield only extends over the coupling of the seals 239 to the medial pipe 202 and is not attached to the medial pipe 202, the medial pipe 202 may rotate underneath the shields 237. According to one aspect, the seals 239 may be glued to the valve body pipe stubs and may be made of stainless steel, for example.

FIG. 16 illustrates a perspective view of the actuator assembly 224 and FIG. 17 illustrates an exploded view of the actuator assembly 224. According to one embodiment, the actuator assembly 224 may be hydraulic and may be comprised an actuator body 236 coupled between an actuator top 238 and an actuator bottom 240. An actuator shaft 242 may extend through an opening in the actuator top 238, through the actuator body 236 and out through an opening in the actuator bottom 240. Located within the actuator body are an actuator rotor vane, an actuator rotor vane seal, an actuator stator vane and an actuator stator vane seal.

The collection valve 200 may be retrofitted into an existing collection line or may be included in a newly installed collection line. In any case, the collection valve 200 may be retrofitted/installed horizontally-oriented relative to the ground.

One of the benefits of this design is that the collection valve 200 according to various embodiments allow the water to be diverted without impacting the inside diameter of the main line. That is, the position of the collection valve 200 will not affect the inside capacity of the main line. Another benefit of the collection valve 200, according to various embodiments, is that the components are Uniform Plumbing Code approved. Another benefit is that the collection valve 200, according to various embodiments, can be scaled for use depending on the size of the main line. For example, some main lines are 4 inches while some are 3 inches. The collection valve 200 can be made for either the 3 inch or the 4 inch.

Exemplary Base Station Control Unit and Operations Therein

Figure 18:
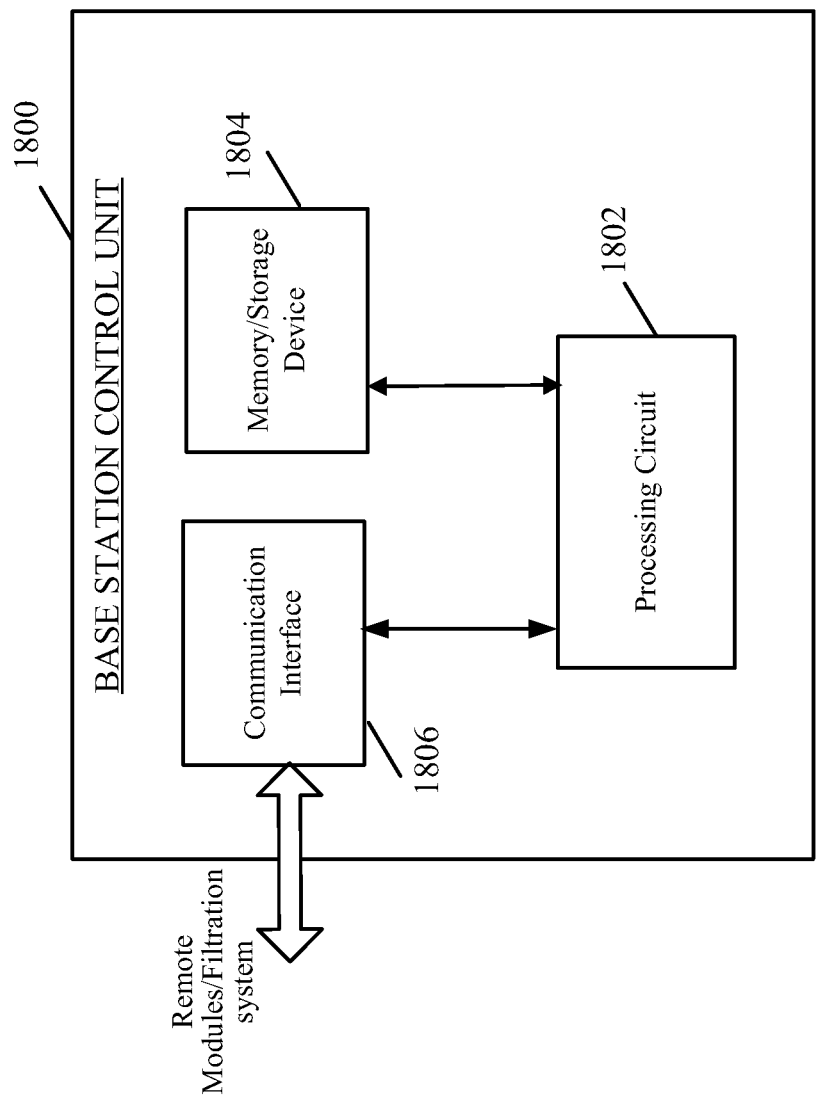
FIG. 18 illustrates a block diagram of an internal structure of a base station control unit according to one example.

FIG. 18 illustrates a block diagram of an internal structure of a base station control unit 1800 according to one example. The base station control unit 1800 may include a processing circuit (e.g., processor, processing module, etc.) 1802 for executing computer-executable process steps and a memory device 1804. The base station control unit 1800 may also include a communication interface 1806 for communicatively coupling the base station control unit 1800 to remote modules such as black water sensors, gray water sensors and low battery indicator; hardware alarms such as overflow sensor in the collection tank and the limit switches for the collection valve; timer and flow detect sensor. The memory/storage device 1804 may include operations (instructions) for rotating the collection valve between first and second positions and activating and de-activating the filtration system, for example.

Figure 19:
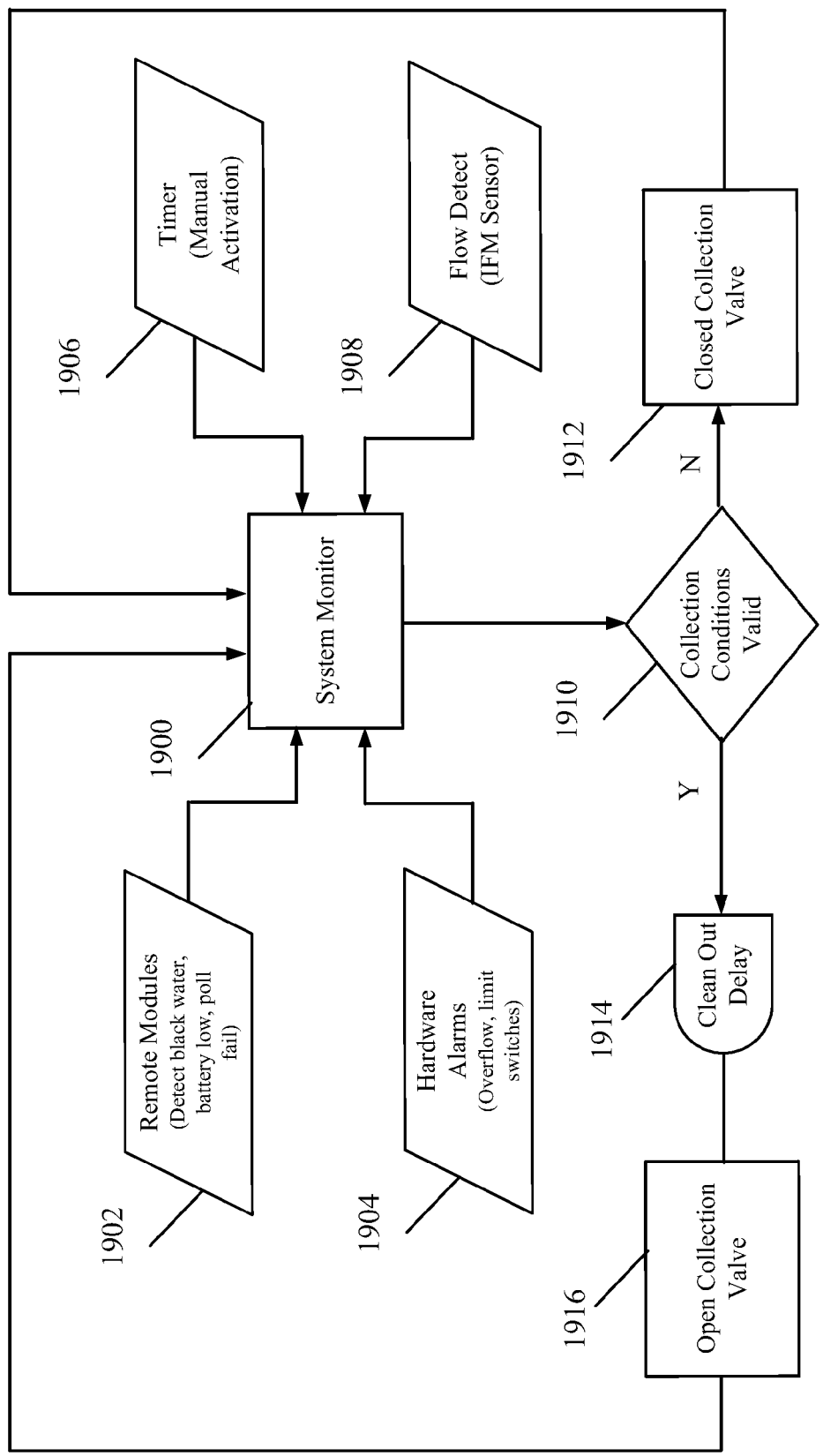
FIG. 19 illustrates a logic diagram of an example of a base control unit monitoring a gray water reclamation system.

FIG. 19 is a logic diagram illustrating an example of a base control unit monitoring the system. The base control unit (or system monitor) 1900 may be configured to communicate wirelessly with remote modules 1902, hardware alarms 1904, timer 1906 and flow detect sensor 1908. The remote modules can include black water sensors, gray water sensors, low battery indicator and poll fail (i.e. sampling the status of external device(s). The hardware alarms can include the overflow sensor in the collection tank and the limit switches for the collection valve.

Initially, the system stands by in a black water state in which the collection valve is switched to the sewer or septic tank. Upon the detection of water flow, the flow detect sensor 1908 may send a signal to the system monitor 1900. Next, system monitor 1900 may determine if the water flowing is black water or gray water. If black water is sensed from one of the remote modules 1902, the collection conditions are determined to be invalid 1910 and the collection valve remains closed or is moved to the closed position 1912. If the collection valve is moved from the open position to the closed position and the operation of the pump and filtration system continue until the gray water in collection tank has been filtered and disinfected.

Alternatively, if the collection conditions are determined to be valid 1910, the drain line may be cleaned out or flushed with gray water for a specific time period, such as two minutes 1914. After the drain line has been flushed about, the collection valve may be opened 1916 so that the water flows into the collection tank. In one embodiment, water flowing into the collection tank can begin operation of the pump and filtration systems in order to process the gray water and supply it to the irrigation tank.

The system monitor 1900 may monitor the hardware alarms 1904 for a shut off event. A "shut off event" may be a system condition which impairs or prevents the safe collection of gray water, for instance, the overcapacity of gray water presently in the collection tank, a power failure, or a clog which is sensed in a black water source. In addition, the operator may also initiate a "shut off event" externally, for instance, by depressing a manual shut off switch. Manually shutting off the system may be desired when the operator is using one of the gray water sources to handle a black water task, for example, using a sink to wash diapers, etc.

FIG. 19 illustrates only one exemplary embodiment of the system in which water flow is detected and several others will become apparent to the reader. For example, sensors could be located on one or more of the gray water sources, and the system could change to a gray water state whenever (i) a gray water event was communicated and (ii) no black water events were communicated (assuming that no shut off events occurred). This represents only one of the possible variations which can be implemented in alternative embodiments under the present invention.

Figure 20:
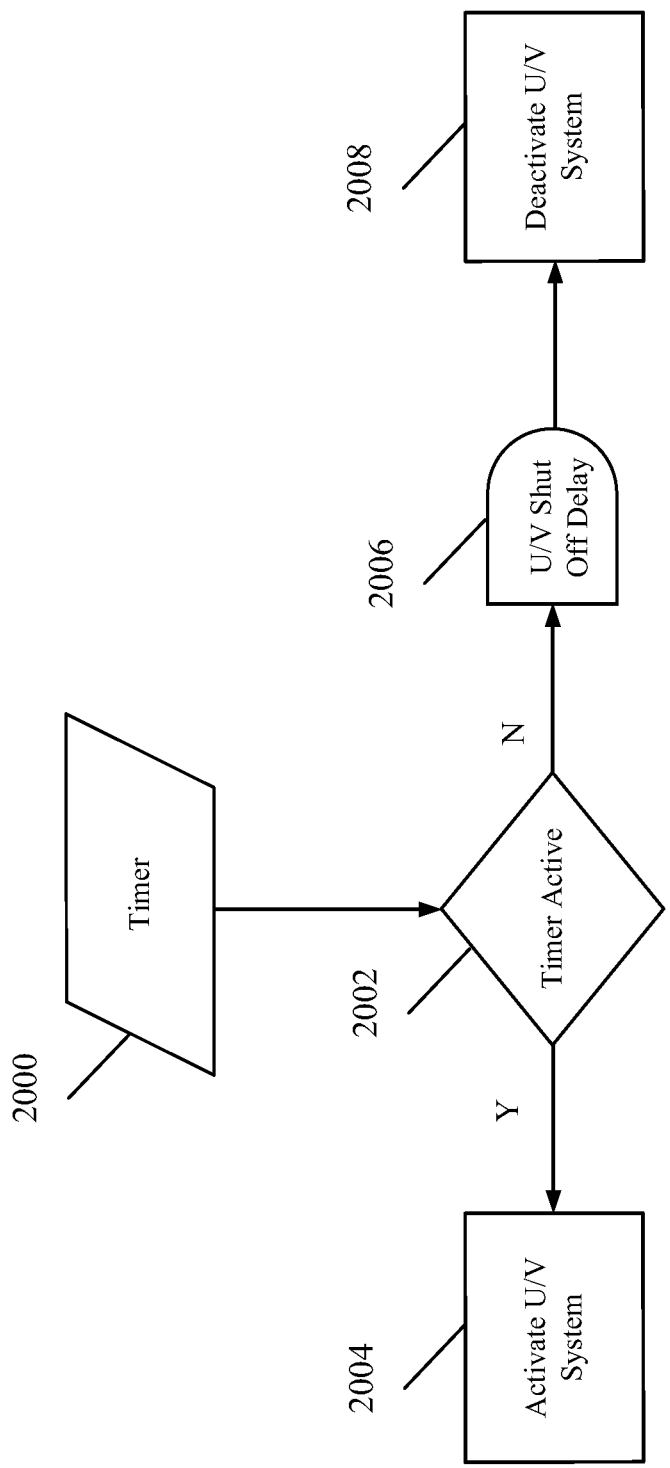
FIG. 20 is a logic diagram illustrating an example of a manual activation timer.

FIG. 20 is a logic diagram illustrating an example of a manual activation timer. The manual activation timer may be located in the utility room, or any other location selected by the home owner, so that the home owner can consciously enable the system to collect gray water or leave it disabled A determination is first made as to whether the timer 2000 has been activated 2002. If the timer 2000 is active, the UV system may be activated (i.e. the pump and filtration system) 2004.

Alternatively, if the timer 2000 is inactive, a shut off delay 2006 may be provided to allow all the gray water in the line to pass through the filtration system. After the shut off delay, the UV system may be de-activated 2008.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A collection valve for use in a water reclamation system, comprising:
    a drain pipe connectable to a drain line in which gray water flows, the drain pipe comprising an inlet pipe, a medial pipe, and an outlet pipe wherein the inlet and outlet pipes are fixed relative to each other, and the medial pipe has a first opening and is disposed in between the inlet pipe and the outlet pipe, and the medial pipe and further is rotatable relative to the inlet and outlet pipes from a first position to a second position;
    a valve plug pipe, surrounding the medial pipe and fixed relative to the inlet and outlet pipes, having a second opening and a belt opening, the belt opening adapted to receive a belt for engaging the medial pipe and rotating the medial pipe between the first and second positions; and
    an actuator assembly fixed relative to the valve plug pipe, the inlet pipe and the outlet pipe, coupled to the valve plug pipe, for rotating the medial pipe between the first and second positions;
    wherein when the medial pipe is rotated to the first position, the first opening of the medial pipe is in alignment with the second opening of the valve plug pipe allowing gray water to pass passing through the medial pipe to drain into a collection tank; and
    wherein when the medial pipe is rotated to the second position, the first opening of the medial pipe is not in alignment with the second opening of the valve plug pipe.

2. The collection valve of claim 1, further comprising:
    a first valve body pipe stub coupling the medial pipe to the outlet pipe; and
    a second valve body pipe stub coupling the medial pipe to the inlet pipe.

3. The collection valve of claim 2, further comprising:
    a first collar placed around the coupling of the inlet pipe and the medial pipe; and
    a second collar placed around the coupling of the outlet pipe and the medial pipe.

4. The collection valve of claim 2, further comprising:
    a first seal joining the medial pipe to the first valve body pipe stub; and
    a second seal joining the medial pipe to the second valve body pipe stub.

5. The collection valve of claim 4, further comprising:
    a first shield having a first portion fixedly attached to the first valve body pipe stub and a second portion extending over, and unattached to, the first seal and the medial pipe; and
    a second shield having a first portion fixedly attached to the first valve body pipe stub and a second portion extending over, and unattached to, the second seal and the medial pipe.

6. The collection valve of claim 4, wherein the first seal and the second seal are circular in shape and have a diameter less than the diameters of the medial pipe, the first valve body pipe stub and the second valve body pipe stub.

7. The collection valve of claim 2, wherein the first valve body pipe stub and the second valve body pipe stub are non-rotatable.

8. The collection valve of claim 1, further comprising:
a drive pulley secured to the actuator assembly and wherein the belt is wrapped around the drive pulley and received in the belt opening of the valve plug pipe.

9. The collection valve of claim 8, wherein the actuator assembly is coupled to the valve plug pipe by an actuator bracket; and wherein the actuator bracket includes a lower portion and an upper portion, the lower portion having a bracket opening adapted to receive the valve plug pipe and the upper portion adapted to couple the actuator assembly to the drive pulley.

10. A gray water collection system, comprising:
a main drain line;
at least one black water source connected to the main drain line;
at least one gray water source connected to the main drain line; and
a collection valve located downstream from at least one of the one or more black water sources, the collection valve comprising:
a drain pipe connectable to the drain line in which gray water flows, the drain pipe comprising:
an inlet pipe,
a medial pipe, and
an outlet pipe fixed relative to the inlet pipe, wherein the medial pipe has a first opening and is rotatable from a first position to a second position;
a valve plug pipe, surrounding the medial pipe, disposed in between the inlet pipe and the outlet pipe, and having a second opening and a belt opening;
an actuator assembly, coupled to the valve plug pipe, and fixed relative to the inlet pipe, outlet pipe and valve plug pipe, for rotating the medial pipe between the first and second positions;
a drive pulley secured to the actuator assembly, the drive pulley and the actuator assembly connected to the valve plug pipe by an actuator bracket; and
a drive belt wrapped around the drive pulley and adapted to be received within the belt opening of the valve plug pipe for engaging the medial pipe and rotating the medial pipe between the first and second positions;
wherein when the medial pipe is rotated to the first position, the first opening of the medial pipe is in alignment with the second opening of the valve plug pipe allowing gray water to pass passing through the medial pipe to drain into a collection tank; and
wherein when the medial pipe is rotated to the second position, the first opening of the medial pipe is not in alignment with the second opening of the valve plug pipe.

11. The system of claim 10, further comprising:
a base control unit in communication with the at least one black water source, the at least one gray water source and the collection valve for monitoring the system.

12. The system of claim 11, further comprising:
a pump located within the collection tank for supplying the gray water collected within the collection tank to a filter for removing and/or reducing particulates and contaminants in the collected gray water; and
an automatic back flush line connected to the filter for allowing temporary reversal of fluid flow to the filter.

13. The system of claim 12, further comprising:
an ultraviolet (UV) light connected to the base control unit, the UV light used to destroy organisms and/or pathogens in the collected gray water.

14. The system of claim 10, wherein the collection valve further comprises:
a first valve body pipe stub coupling the medial pipe to the outlet pipe; and
a second valve body pipe stub coupling the medial pipe to the inlet pipe.

15. The system of claim 14, wherein the collection valve further comprises:
a first collar placed around the coupling of the inlet pipe and the medial pipe; and
a second collar placed around the coupling of the outlet pipe and the medial pipe.

16. The system of claim 14, wherein the collection valve further comprises:
a first seal joining the medial pipe to the first valve body pipe stub; and
a second seal joining the medial pipe to the second valve body pipe stub.

17. The system of claim 16, wherein the collection valve further comprises:
a first shield having a first portion fixedly attached to the first valve body pipe stub and a second portion extending over, and unattached to, the first seal and the medial pipe; and
a second shield having a first portion fixedly attached to the first valve body pipe stub and a second portion extending over, and unattached to, the second seal and the medial pipe.

18. The system of claim 16, wherein the first seal and the second seal are circular in shape and have a diameter less than the diameters of the medial pipe, the first valve body pipe stub and the second valve body pipe stub.

19. The system of claim 10, wherein the actuator bracket includes a lower portion and an upper portion, the lower portion having a bracket opening adapted to receive the valve plug pipe and the upper portion adapted to couple the actuator assembly to the drive pulley.

20. The system of claim 10, wherein the belt opening is longitudinal and extends at least halfway around circumference of the valve plug pipe.

* * * * *